United States Patent Office 3,022,175
Patented Feb. 20, 1962

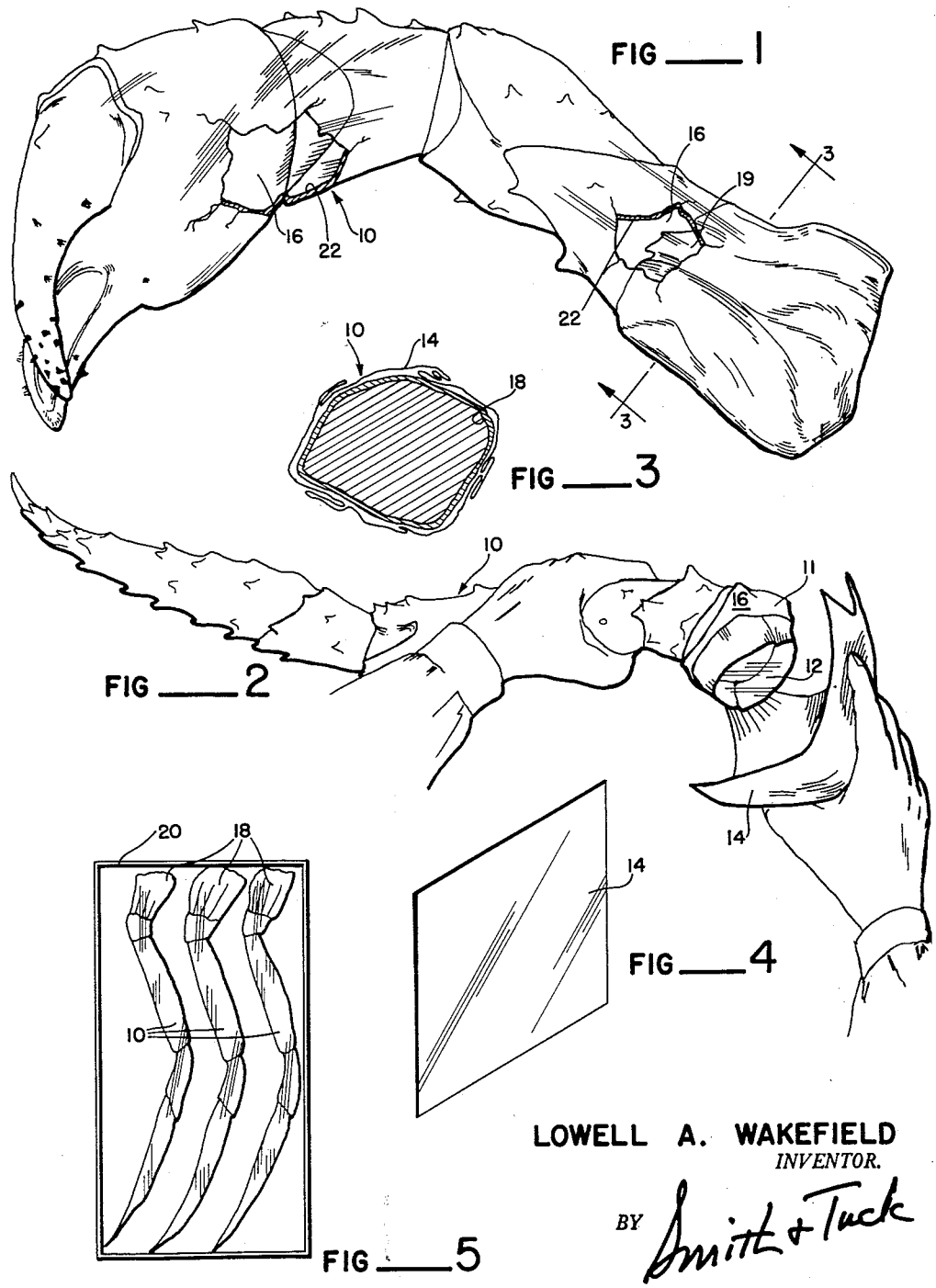
LOWELL A. WAKEFIELD
INVENTOR.

3,022,175
PREPARATION OF KING CRAB LEGS
Lowell A. Wakefield, Seattle, Wash., assignor to Wakefield's Deep Sea Trawlers, Inc., Seattle, Wash., a corporation of Washington
Filed Dec. 15, 1958, Ser. No. 780,340
4 Claims. (Cl. 99—111)

This invention relates to preservation of crustaceans and, more particularly, to the preparation of crab legs for refrigerated storage.

From the waters of the North Pacific Ocean fishermen take a species of crab known as the "king crab" which is a crustacean of the family *Paralithodes camschatica*. This particular species of crab is remarkable for its size and delicacy of flavor of the meat of the legs. In general it can be stated that the single-claw legs vary in length between about 22 inches and about 30 inches and may weigh between about three-quarters and about one and one-half pounds. Similarly the leg provided with pincer claws may be about 10 inches to 18 inches in length and weigh between one-half and one and one-half pounds.

As is well known the legs of a crab, usually eight in number, are attached to the body on the underside of the main shell by means of an articulated joint which is severed when the legs are removed. The crab meat in the leg is the most desirable in this crustacean and it is important in its preservation that it be protected in those instances where the crab leg is being marketed frozen, whole and in shell, as in recent years has become general practice.

The legs are severed from the body either by cutting the joint or by being manually broken away. Under such circumstances, while most of the meat in the crab leg is protected during refrigerated storage by the shell in which it is naturally encased, that meat at the joint or at the point of severance from the body is exposed. If the crab leg is to be frozen and stored for any period of time various undesirable conditions come into existence and the result generally is a loss of delectability, weight and desirable appearance. Also the exposed meat may be contaminated by contact with dirt or bacteria. These undesirable results are ordinarily caused by the fact that in low temperature refrigerated storage the exposed meat suffers from "locker burn," dehydration due to the absorption of moisture from within the leg through the exposed meat portion to the refrigerated atmosphere and its dehydrator, and because of changes of color, or, to put it another way, the discoloration of the exposed meat.

In the normal preparation of these crab legs for refrigerated storage it is customary to arrange them in a container large enough to receive, for example, twelve crab legs. They are arranged in a pack while they are still flexible and thereafter sharp frozen at temperatures between about —40 F. and about —10 F. The pack is then glazed by being dipped in water or aqueous glazing solutions, whereupon, due to the extreme cold of the frozen crab legs a thin shell glaze of ice is formed over the entire surface of each of the crab legs. While it is intended that this glaze will satisfactorily protect the crab legs from dehydration and the other undesirable effects set forth above, it has been noted that simple glazing is not suitably protective of exposed meat surfaces for market purposes.

Having in mind all of the conditions and attendant problems related herein and otherwise, it has been among the objects of my invention to provide a method or process of preparing a crab leg for refrigerated storage as a result of the practice of which, dehydration is reduced, surface contamination eliminated, discoloration of the exposed meat is largely avoided, and the retention of the high percentage of the original weight of the crab leg is insured. These and other objects will become more apparent in the course of the following specification in which I have set forth and described the preferred forms of my invention.

In the drawings forming a part of this specification in which like numerals refer to like parts of the same—

FIGURE 1 is an elevation view of a crab leg prepared for refrigerated storage, portions of an aqueous glaze being broken away for illustrative purposes;

FIGURE 2 shows the method of manually encasing a severed crab leg; and

FIGURE 3 is a cross-section taken in the plane indicated 3—3 of FIGURE 1;

FIGURE 4 is a perspective view of a moisture impervious sheet used to encase a crab leg end; and FIGURE 5 schematically shows a package of crab leg prepared for refrigerated storage.

Referring to FIGURE 2 it will be seen that a step in the procedure of manually encasing the unprotected end of a severed crab leg is shown. Typically, a workman will grasp the crab leg 10 with his left hand and present its severed end 11 and the exposed crab meat 12 to a flexbile sheet encasing element 14 in the right hand. Usually sheet 14 is loosely gripped and slightly cupped in the operator's hand as it is placed over the end of the crab leg. It will be understood that while the majority of the meat in the crab leg 10 is quite well protected by the shell encasing it, the moisture in the meat is exposed to dehydration through so small a relative surface 12 of exposure simply because of the high dehydration effect that is present during low temperature storage over protracted periods.

The slightly cupped sheet 14 is collapsed into enclosing relationship over the severed end of the crab leg 10 and is manipulated by the fingers or in similar manner to cause it to closely cover and encase the exposed meat and a portion of the adjacent shell. In effect, the encasing sheet is collapsed about the shell of the crab leg in the area designated 16 in FIGURE 2.

In FIGURE 3 I depict in a cross-section view the condition just previously described. It will be seen that the shell 18 of the leg 10 is substantially filled with crab meat. About the exterior of said shell the collapsed sheet 14 is shown brought into close engagement through the formation of wrinkles and overlaps and the like caused by the gathering together of the margins of the otherwise flat sheet 14. This will be fully understood by those skilled in the art to result in the formation of a cup 19 about the end of the crab leg.

Ordinarily the encased crab legs are sorted according to size and type and it is customary for a plurality, for example, a dozen, to be arranged in a container 20 as shown in FIGURE 5 to form a "pack." The pack and its container is next introduced into a sharp freezing chamber, where under the effect of extremely low temperature the meat is frozen for preservation. The presence of moisture on the crab legs during this freezing operation tends to cause the individual members of the pack to freeze together, whereupon a block, for example twelve crab legs, is produced. The same thereafter may be immersed in a glazing solution or in water momentarily for the formation of a thin shell of ice 22 fully encasing the crab leg and the collapsed end cup 19. During this immersion glazing fluid enters the interstices in the folds of the moisture-impervious sheet about the shell 18. When this water is frozen it marginally seals the cup edges to the crab shell 18 adjacent the severed and otherwise exposed area. Thereafter a crab leg or its pack is returned to storage under refrigerated conditions.

The sheet 14 is preferably formed of a metallic foil of a weight between about .0005 and about .002. If desired it may display a trademark, preparation and serving instruction, or similar information and indicia. Alternatively sheet 14 may be formed of paper having high moisture resistant characteristics or it may be formed of any of the impervious plastic sheets of which the polymers and co-polymers of vinylidene chlorides, for example "Saran" is typical. The desirable characteristics of such a sheet are that it be thin, easily handled, have a relatively low degree "memory," be inexpensive, be moisture proof, and have sufficient strength to resist the forces encountered during its application to the crab leg and during handling it for storage and into the market.

When crab legs packed and prepared as described herein are displayed for sale, or taken to the food kitchen it will be apparent that contamination and dehydration have been avoided, that odor is eliminated, and that sanitary conditions have been maintained.

Having thus described my invention, I claim:

1. In the preparation of a king crab leg for refrigerated storage, said leg being upwards of about 10 inches to about 30 inches and being unshelled and severed from a crab body; the method, comprising: sharp freezing the crab leg, manually collapsing a moisture-impervious sheet in enclosing relationship over the severed end of the leg and closely about adjacent shell, and aqueously glazing said leg and its enclosure and simultaneously glaze-sealing the collapsed enclosure to the underlying adjacent shell.

2. In the preparation of a king crab leg for refrigerated storage, said leg being upwards of about 10 inches to about 30 inches and being unshelled and severed from a crab body; the method, comprising manually cupping a moisture-impervious sheet and collapsing the same in enclosing relationship over the severed end of the leg and closely about adjacent shell, freezing said crab leg, and then aqueously glazing said leg and its enclosure and simultaneously glaze-sealing the collapsed enclosure to the underlying adjacent shell.

3. In the preparation of a king crab leg for refrigerated storage, said leg being upwards of about 10 inches to about 30 inches and being unshelled and severed from a crab body; the method comprising: sharp freezing the crab leg, manually collapsing a moisture-impervious sheet in enclosing relationship over the severed end of the leg and closely about adjacent shell, and glazing said leg and its enclosure by total immersion in an aqueous bath to glaze-seal the collapsed enclosure to the underlying adjacent shell.

4. In the preparation of a king crab leg for refrigerated storage, said leg being upwards of about 10 inches to about 30 inches and being unshelled and severed from a crab body; the method, comprising: manually cupping a moisture-impervious sheet and collapsing the same in enclosing relationship over the severed end of the leg and closely about adjacent shell, freezing said crab leg, and then glazing said leg and its enclosure by total immersion in an aqueous bath to glaze-seal the collapsed enclosure to the underlying adjacent shell.

References Cited in the file of this patent

UNITED STATES PATENTS

| | | |
|---|---|---|
| 1,487,883 | Petersen | Mar. 25, 1924 |
| 1,660,045 | Petersen | Feb. 21, 1928 |
| 2,151,967 | Hedreen et al. | Mar. 28, 1939 |
| 2,563,364 | Proctor | Aug. 7, 1951 |
| 2,865,765 | Allen | Dec. 23, 1958 |

FOREIGN PATENTS

| | | |
|---|---|---|
| 17,444/34 | Australia | May 5, 1934 |

OTHER REFERENCES

"Modern Encyclopedia of Cooking," vol. II, 1949, by Meta Given, published by J. G. Ferguson and Associates, Chicago, Ill., page 916, article entitled, Cooking Hard-Shelled Crabs.